US006494965B1

(12) United States Patent
Walker et al.

(10) Patent No.: US 6,494,965 B1
(45) Date of Patent: Dec. 17, 2002

(54) METHOD AND APPARATUS FOR REMOVAL OF LASER ABLATION BYPRODUCTS

(75) Inventors: Lauren E. Walker, North Vancouver (CA); Vince Beyer, Vancouver (CA); Janice L. Blok, North Vancouver (CA); David B. Burgess, Vancouver (CA)

(73) Assignee: Creo Products Inc., Burnaby (CA)

( * ) Notice: Subject to any disclaimer, the term of this patent is extended or adjusted under 35 U.S.C. 154(b) by 138 days.

(21) Appl. No.: 09/580,602

(22) Filed: May 30, 2000

(51) Int. Cl.[7] .................................................. B08B 5/04
(52) U.S. Cl. ........................ 134/21; 134/34; 134/104.2; 134/36; 134/37; 15/300.1; 15/301; 15/316.1; 15/318
(58) Field of Search .................. 134/21, 34, 104.2, 134/36, 37; 15/300.1, 301, 316.1, 318

(56) References Cited

U.S. PATENT DOCUMENTS 5,424,508 A * 6/1995 Swain et al. .................. 216/65
5,460,284 A * 10/1995 Foltz et al. .................. 137/814
5,496,985 A   3/1996 Foltz ..................... 219/121.67
5,630,807 A   5/1997 Joffe ........................... 604/315
5,925,024 A   7/1999 Joffe ........................... 604/313

* cited by examiner

Primary Examiner—Randy Gulakowski
Assistant Examiner—M. Kornakov
(74) Attorney, Agent, or Firm—Oyen Wiggs Green & Mutala

(57) ABSTRACT

A method and apparatus are provided for the removal of laser ablation byproducts generated in the imaging of laser sensitive media. In accordance with the invention, the byproducts are generated when a laser sensitive media is imaged with a laser. At least two sources of fluid flow are directed toward the imaging area and are oriented such that a substantial component of the bias of one source is antiparallel with that of the other. These two fluid flow sources are operative to direct the ablation byproducts away from the imaging area, where they are collected by a sink, to which fluid moves. The sink removes the ablation byproducts from the vicinity of the laser sensitive media.

33 Claims, 2 Drawing Sheets

METHOD AND APPARATUS FOR REMOVAL OF LASER ABLATION BYPRODUCTS

FIELD OF THE INVENTION

The present invention relates to the field of imaging laser sensitive media using lasers. Specifically, the invention relates to a technique of debris removal for an ablative imaging process.

BACKGROUND OF THE INVENTION

The notion of using laser imaging is well known in the art. A laser sensitive media is mounted onto the surface of an imaging cylinder and an image is imparted onto the media using a focused write laser of relatively high power. This process is known as "imaging" and the laser sensitive media bearing the image is said to be "imaged".

During imaging, the interaction of the laser and the media causes a physical and/or chemical change to the imaged areas of the media. In the process of imaging, matter may be expelled from the laser sensitive media. The expulsion of matter from the media is referred to as ablation. The matter expelled may consist of solids, liquids, gases and plasma; which is commonly considered to be smoke or particulate debris. This smoke and particulate debris are referred to in this application as "ablation byproducts", "ablation dust" or "ablation debris".

Ablation byproducts present several difficulties, which may hamper the imaging process. A first problem is related to the immediate effect of the smoke and particulate debris, which accumulates in the imaging area. The functionality of the imaging lasers is impeded by the ablation byproducts in the vicinity of the imaging area. If the lasers are obstructed by smoke and particulate matter, then the result will be a poorly imaged laser sensitive media. Consequently, a need exists for a technique to remove the ablation byproducts from the imaging area in a manner that prevents any negative interaction between the ablation byproducts and the lasers.

When created during the imagewise ablation of a laser sensitive media, the ablation byproducts can also resettle onto the media; this is known as redeposit. This is a particularly critical problem in imaging laser sensitive media, because redeposit can be associated with imaging artifacts which are visible on the final product. Once redeposit has occurred it is difficult to remove the ablative byproducts from the media. Consequently, debris that has resettled onto the media is difficult to remove without damaging the image. A need exists for a technique to remove ablation byproducts from the imaging area of a laser sensitive media so as to minimize the amount of redeposit of debris on the surface of the laser sensitive media.

A third problem associated with ablation byproducts is related to the tendency of the ablation debris to accumulate in the sensitive areas of the imaging lasers and other areas of the imaging device. The ablation debris is dust-like in nature and has a tendency to accumulate almost anywhere. Accumulation of ablation debris can cause severe degradation and/or damage to the components in the imaging system, particularly the laser optics. For example, if a layer of debris collects on a lens, it may drastically affect the lens' optical performance. For this reason, a need exists for a technique of removing ablation byproducts completely and efficiently from the vicinity of the imaging lasers and the other sensitive areas of the imaging device.

The nature of the ablation byproducts presents a difficulty with respect to its movement. Any attempt to physically move ablation byproducts in a rapid manner is likely to create a dispersing and fast moving plume of ablative byproducts. Once a plume of debris is created in this manner, it may become exceptionally difficult to control or direct and efficiently collect or remove from the imaging device. As a result, a need exists for a technique to direct and trap ablative debris away from the vicinity of an imaging area in a controlled manner, so as to allow efficient collection or removal of the debris.

FIG. 1 depicts two of the techniques used in the prior art. Laser 11 in the imaging head 10 is focused on the imaging area 14 of the media 15 by the laser optics 12 and 13. To date, debris removal techniques have concentrated on sucking or blowing the debris out of the imaging area 14. When ablation byproducts (not shown) are created, they may be sucked out of the imaging area 14 by vacuum source 17. Alternatively, the ablation byproducts may be blown out of the imaging area 14 by air jet 16. Each of these prior art techniques suffer from some of the aforementioned drawbacks. Specifically, the vacuum source 17 does not remove the ablation byproducts very effectively and there may be substantial interference with the lasers. In addition, the method involving air jet 16 effectively removes the debris from the imaging area 14, but generally causes the dispersion of the dust, allowing it to settle on the functional elements of the imaging head 10, and back onto the laser sensitive media 15.

SUMMARY OF THE INVENTION

In accordance with the present invention, a method and apparatus for the removal of byproducts associated with laser ablation on a laser sensitive media is disclosed. The invention involves a principal source of fluid flow (a component of which is oriented in a principal direction) and a secondary source of fluid flow (a component of which is oriented in a secondary direction). The principal and secondary sources of fluid flow are then used to direct the ablation byproducts. The ablation byproducts are moved in the principal direction and away from the vicinity of the imaging area by the principal fluid source. However, the debris is simultaneously restrained, so as to ensure that it does not travel too far in the principal direction and that it is not excessively dispersed. The invention also involves a sink, to which fluid moves, which collects the ablation byproducts and removes them from the vicinity of the imaging area.

A laser is given in this application to be any electromagnetic radiation of enough intensity to cause ablation as defined above.

Advantageously, the principal and secondary sources of fluid flow may be effected by a plurality of fluid sources.

Preferably, the sources of fluid flow may be effected by orifices attached to sources of pressurized fluid.

Advantageously, the sink, to which fluid moves, may be effected by a plurality of fluid sinks.

Preferably, the sink may be effected by an orifice attached to a vacuum source.

The laser sensitive media used in the present invention may be mounted on or integral with a flat surface, cylindrical surface, or other advantageous geometry.

Advantageously, the laser sensitive media may be usable in a printing process, which is one of: flexographic printing, lithographic printing, letterpress printing, gravure printing, or xerographic printing.

Advantageously, the invention may involve the additional provision of a barrier adjacent to the imaging area. The barrier is operative to allow the ablation byproducts to pass by the barrier in the principal direction, but to help bias the flow of fluid in the secondary direction.

Another aspect of the present invention concerns a method and apparatus for the removal of the byproducts associated with laser ablation on a laser sensitive media. As before, this aspect of the invention involves providing a principal source of fluid flow. The principal source of fluid flow (a component of which is oriented in a principal direction) directs the ablation byproducts away from the imaging area in the principal direction. A counter-flow source of fluid flow is also required. The counter-flow fluid source creates fluid flow in a counter-flow direction (at least a component of which is anti-parallel to the principal direction). The counter flow fluid source also acts to restrain the ablation byproducts, so as to ensure that they do not travel too far in the principal direction and that they are not excessively dispersed. The final requirement is a sink, to which fluid moves, which creates a fluid flow oriented in a third direction, at least one component of which is substantially orthogonal to the principal direction. The sink collects the ablation byproducts, removing them from the vicinity of the imaging area.

A third aspect of the invention also concerns a method and apparatus for the removal of byproducts associated with laser ablation on a laser sensitive media. As with the previous embodiments, the first requirement is a principal source of fluid flow, which (a component of which is oriented in a principal direction) directs the ablation byproducts away from the vicinity of the imaging area in the principal direction. A plurality of secondary sources of fluid flow is also provided. They create fluid flow in a secondary direction (at least a component of which is orthogonal to the a surface of the laser sensitive media). The plurality of secondary sources of fluid flow also act to restrain the ablation byproducts, ensuring that they do not travel too far in the principal direction and that they are not excessively dispersed. The method also involves the provision of a sink, to which fluid moves, in a third direction (at least one component of which is substantially orthogonal to the principal direction). The sink collects the ablation byproducts, removing them from the vicinity of the imaging area.

Further advantages of the invention will become apparent when considering the drawings in conjunction with the detailed description.

DESCRIPTION OF THE PREFERRED EMBODIMENT

Figure 1:
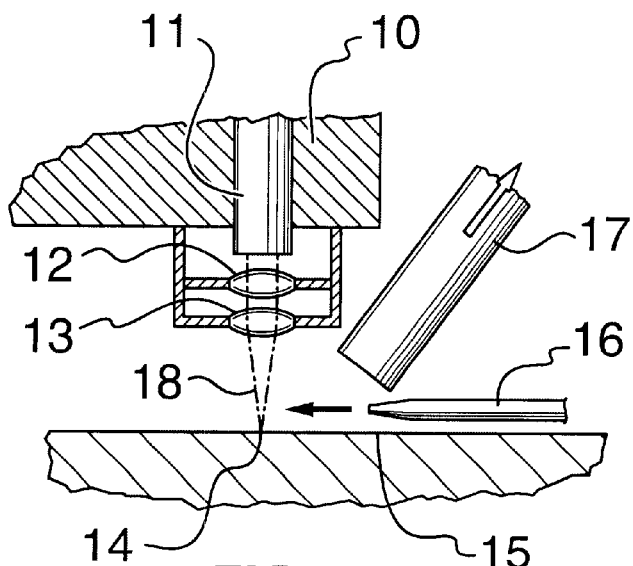
FIG. 1 depicts two prior art processes, suction and high-pressure, for removing ablation debris from the imaging area of a laser sensitive media.
Figure 2:
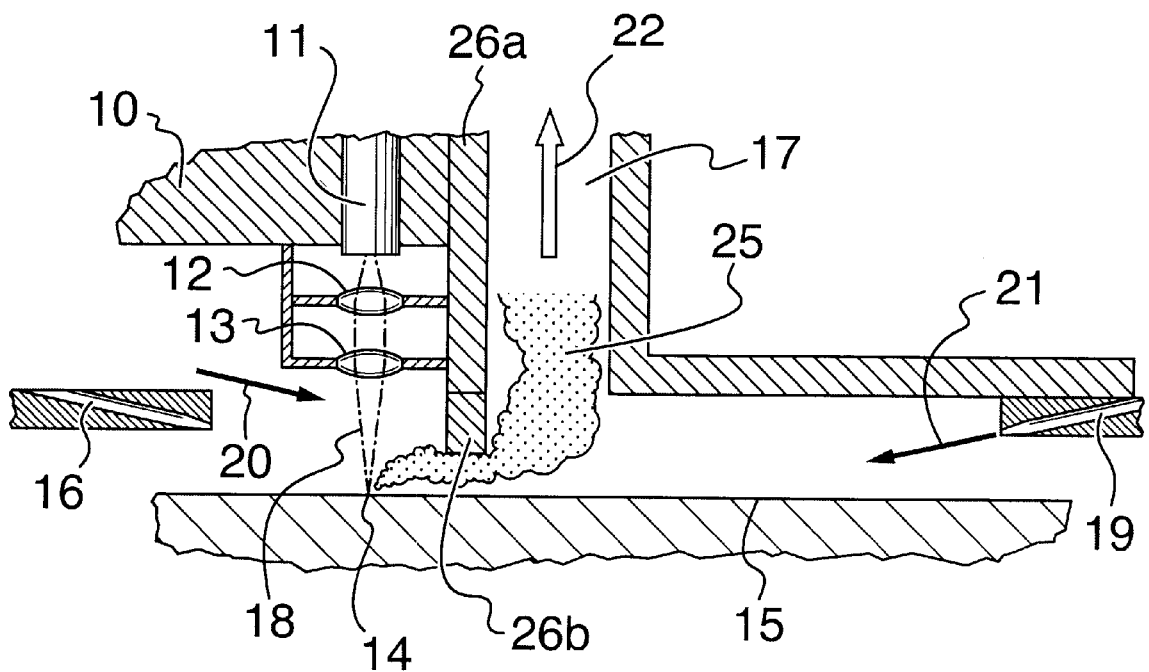
FIG. 2 depicts a first embodiment of the invention employing a principal air jet and a counter-flow air jet.

Referring to FIG. 2, there is provided a debris removal system in accordance with one embodiment of the present invention. The imaging head 10 is equipped with an imaging laser 11, and optics 12 and 13, which act in unison to produce the laser imaging beam 18. The optics 12 and 13 act to focus the laser 18 on the imaging area 14 of the imaging cylinder 15. The imaging cylinder 15 bears a laser sensitive media (not shown). When the laser 18 shines on the imaging area 14, it exposes the media and produces ablation debris 25.

The invention comprises a conventional sink, to which fluid moves, which is generally a relatively large orifice 17 near the imaging head 10. The sink is typically generated by attaching a vacuum line (not shown) to an orifice 17. The invention also comprises at least two sources of fluid flow, which are embodied by air jets 16 and 19. Although this invention is described with reference to air jets, the air jets 16 and 18 may be any sources of fluid flow and the material that they eject may be any fluid. In addition, each of the air jets 16 and 19 may actually comprise a plurality of air jets, which act in unison to perform essentially the same function. The invention should be understood to incorporate these broader concepts.

Air jet 16 is referred to in this application as the "principal air jet" 16 and is directed in direction 20, which is typically in the range of 5–25 degrees with respect to the axis of the printing cylinder 15. When the laser 11 is on, it exposes the media in the imaging area 14, generating ablation byproducts 25. The principal air jet 16 generates a diverging cone of air (not shown), which moves at relatively high speed in direction 20, and which carries the smoke and debris 25 in the direction of the sink 17. When the ablation debris 25 nears the sink 17, the suction provided in the sink 17 collects the ablation debris 25, drawing it away from the cylinder 15 in direction 22.

Air jet 19 is referred to in this application as the "counter-flow air jet" and is directed in direction 21. The air emanating from the counter-flow air jet 19 forms a diverging cone of air (not shown) traveling in direction 21, which acts to counter-balance the flow of air from the principal air jet 16. This counter-balancing effect prevents the principal air jet 16 from blowing the ablation debris 25 past the sink 17.

The pressure and flow of the principal air jet 16 and the counter-flow air jet 19 are adjustable, so as to create a rough equilibrium under the sink 17. In this manner, the ablation debris 25 is directed or "steered" by the air jets (16 and 19) so as to be easily collected by the sink 17.

An additional optional feature of the invention involves a longer conduit wall 26b, which acts to prevent the ablation byproducts 25 from escaping in direction 20. With the addition of the larger conduit wall 26b, the sink 17 collects more air and debris 25 from the counter-flow side of the orifice 17. When the laser 11 creates the ablation byproducts 25, they are formed relatively close to the cylinder 15. Consequently, when they interact with the air emanating from principal air jet 16, the air is able to carry the dust and smoke 25 underneath the low conduit wall 26b. Once the ablation byproducts 25 are blown past the low conduit wall 26b, they slow down due to the opposing air and rise (or they are sucked) away from the cylinder 15.

The transport of the ablation byproducts 25 in accordance with the above-described technique avoids interaction between the debris 25 and the lasers 11. The technique also prevents resettling of the ablative debris 25 onto the media. Finally, the above described invention effects substantially complete and efficient removal of the ablation byproducts 25 from the vicinity of the sensitive imaging head 10 in a relatively controlled manner.

Figure 3A:
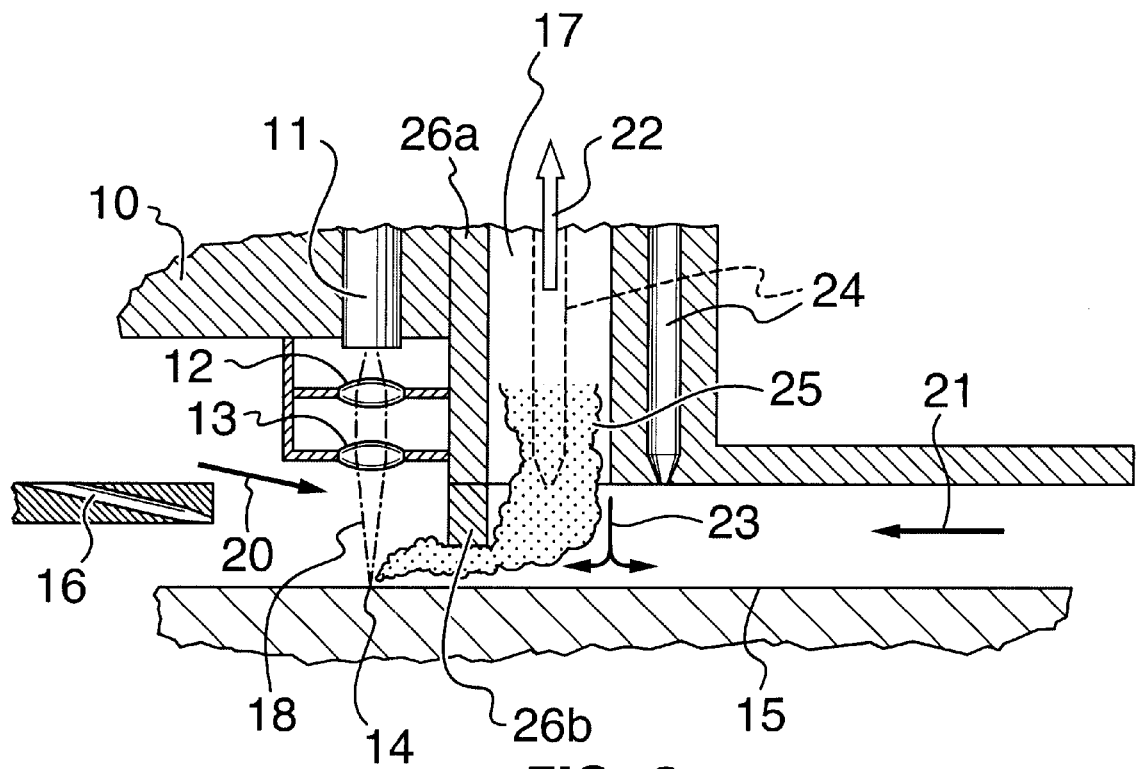
FIGS. 3a and 3b depict a second embodiment of the invention employing the air curtain technique of containing the ablation debris.
Figure 3B:
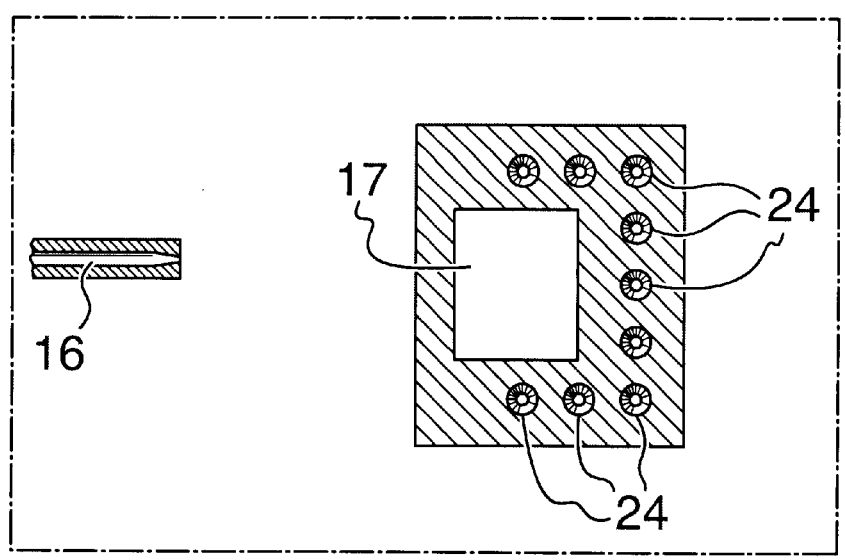

Referring to FIGS. 3a and 3b, an alternative embodiment of the invention is depicted in cross-section (FIG. 3a) and in plan view (FIG. 3b). Rather than having a counter-flow air jet, the embodiments in FIGS. 3a and 3b comprise an "air curtain", which is generated by a plurality of air jets 24, oriented substantially orthogonal to the surface of the imaging cylinder 15. As with the previous embodiment, the air jets 24, which form the air curtain, may be any sources of fluid flow and the material that they eject may be any fluid. In addition, each of the air jets 16 and 24 may actually comprise a plurality of air jets, which act in unison to perform essentially the same functions. The invention should be understood to incorporate these broader concepts.

The air ejected from the air curtain air jets 24 travels towards the cylinder surface 15, where it is deflected in the manner shown by arrow 23. The deflected air from the air curtain (not shown) functions in a manner similar to that of the counter-flow air jet 19 in the FIG. 2 embodiment. The air from the air curtain counteracts the flow of debris 25 borne by the air from the principal air jet 16, so that it may be collected by the sink 17.

As with the FIG. 2 embodiment, the pressure and flow rate of the principal air jet 16 and the air curtain air jets 24 of the air curtain may be adjusted, so as to create a rough equilibrium under the sink 17. In addition, the extended conduit wall 26b may be added to facilitate collection of more air from the air-curtain side of the orifice 17 and to prevent the ablation byproducts 25 from escaping via direction 20 by biasing the air flow from direction 21.

Similarly to the previous embodiment, the above-described technique of conducting the ablation byproducts 25 away from the imaging area 14 avoids interaction between the debris 25 and the lasers 11. The air curtain embodiment also prevents resettling of the ablative debris 25 onto the media. The principal air jet 16, in combination with the air jets 24 of the air curtain and the sink 17, remove the ablation byproducts 25 from the vicinity of the sensitive imaging head 10 in a relatively controlled manner, which is efficient and substantially complete.

It should be understood that the above description is intended for illustrative purposes only, and is not intended to limit the scope of the present invention in any way. Those skilled in the art will appreciate that various modifications can be made to the embodiments discussed above without departing from the spirit of the present invention. Specifically, such modifications include different orientations and geometries of the principal, counter-flow and air curtain sources, which are commonly referred to in this application as jets. The invention should be understood to incorporate any techniques involving at least one sink, to which fluid moves, and a plurality of sources biased at different angles (so as to counteract one another in some degree) and comprising different geometries. Additionally, the embodiments discussed above refer to a cylindrical imaging surface, but the invention should be understood to incorporate imaging processes on flat surfaces or other shapes of imaging surfaces.

What is claimed is:

1. A method for removing byproducts associated with laser ablation from a vicinity of an imaging area on a laser sensitive media, the method comprising:
   (a) creating a principal fluid flow, a component of which is oriented in a principal direction;
   (b) creating a secondary fluid flow, a component of which is oriented in a secondary direction opposed to said principal direction;
   (c) allowing said principal fluid flow to move said ablation byproducts in said principal direction away from the vicinity of said imaging area toward a sink; and,
   (d) allowing said secondary fluid flow to slow movement of said ablation byproducts in the principal direction while drawing fluid in a third direction away from said laser sensitive media and into said sink, so as to collect said ablation byproducts.

2. A method according to claim 1, wherein said principal source of fluid flow is effected by at least one gas jet.

3. A method according to claim 1, wherein said secondary source of fluid flow is effected by at least one gas jet.

4. A method according to claim 1, wherein said sink, to which fluid moves, is effected by an orifice attached to a vacuum source.

5. A method according to claim 1, wherein said laser sensitive media is mounted on one of: a flat surface, and a cylindrical surface of a printing cylinder.

6. A method according to claim 1, wherein said laser sensitive media is usable in a printing process, which is selected from the group consisting of: flexographic printing, lithographic printing, letterpress printing, gravure printing, and xerographic printing.

7. A method according to claim 1, wherein said ablation byproducts comprise smoke and particles of media dislodged from said laser sensitive media during ablation.

8. A method according to claim 1, comprising providing a barrier adjacent to said imaging area, said barrier being operative to allow said ablation byproducts to pass by said barrier in said principal direction.

9. A method of removing byproducts associated with laser ablation from a vicinity of an imaging area on a laser sensitive media, the method comprising:
   (a) providing a principal source of fluid flow, which performs the steps of:
      (i) creating fluid flow, a component of which is oriented in a principal direction; and
      (ii) directing said ablation byproducts, so as to move them in said principal direction and away from the vicinity of said imaging area;
   (b) providing a counter-flow source of fluid flow, which performs the steps of:
      (i) creating fluid flow in a counter-flow direction, at least a component of said counter-flow direction being opposite to said principal direction; and
      (ii) restricting a distance of travel of said ablation byproducts in said principal direction; and
   (c) providing a sink, to which fluid moves, which performs the steps of:
      (i) creating a fluid flow oriented in a third direction, at least one component of which is orthogonal to said principal direction; and
      (ii) collecting said ablation byproducts.

10. A method according to claim 9, wherein each of said principal source of fluid flow and said counter-flow source of fluid flow are effected by at least one gas jet.

11. A method according to claim 9, wherein said sink, to which fluid moves, is effected by an orifice attached to a vacuum source.

12. A method according to claim 9, wherein said laser sensitive media is mounted on one of: a flat surface, and a cylindrical surface of a printing cylinder.

13. A method according to claim 9, wherein said laser sensitive media is usable in a printing process, which is selected from the group consisting of: flexographic printing, lithographic printing, letterpress printing, gravure printing, and xerographic printing.

14. A method according to claim 9, wherein said ablation byproducts comprise smoke and particles of media dislodged from said laser sensitive media during ablation.

15. A method according to claim 9, which further comprises providing a barrier adjacent to said imaging area, said barrier being operative to allow said ablation byproducts to pass by said barrier in said principal direction.

16. A method of removing byproducts associated with laser ablation from a vicinity of an imaging area on a laser sensitive media, said method comprising:
(a) providing a principal source of fluid flow, which performs the steps of:
   (i) creating fluid flow, a component of which is oriented in a principal direction; and
   (ii) directing said ablation byproducts, so as to move them in said principal direction and away from the vicinity of said imaging area;
(b) providing a plurality of secondary sources of fluid flow, which perform the steps of:
   (i) creating a secondary fluid flow, at least a component of said secondary fluid flow being orthogonal to a surface of said laser sensitive media, and at least a component of said secondary fluid flow being opposed to said principle direction; and
   (ii) restraining said ablation byproducts, so as to ensure that they do not travel past the secondary sources in said principal direction; and
(c) providing a sink, to which fluid moves, which performs the steps of:
   (i) creating a fluid flow oriented in a third direction, at least one component of which is orthogonal to said principal direction; and
   (ii) collecting said ablation byproducts.

17. A method according to claim 16, wherein each of said principal source of fluid flow and said secondary sources of fluid flow are effected by at least one gas jet.

18. A method according to claim 16, wherein said sink, to which fluid moves, is effected by an orifice attached to a vacuum source.

19. A method according to claim 16, wherein said laser sensitive media is mounted on one of: a flat surface, and a cylindrical surface of a printing cylinder.

20. A method according to claim 16, wherein said laser sensitive media is usable in a printing process, which is selected from the group consisting of: flexographic printing, lithographic printing, letterpress printing, gravure printing, and xerographic printing.

21. A method according to claim 16, wherein said ablation byproducts comprise smoke and particles of media dislodged from said laser sensitive media during ablation.

22. A method according to claim 16, which further comprises providing a barrier adjacent to said imaging area, said barrier being operative to allow said ablation byproducts to pass by said barrier in said principal direction.

23. A method for removing ablation debris generated during imaging of an imaging area of a laser-sensitive medium, the method comprising:
generating a first fluid flow across the imaging area, the first fluid flow directed in a first direction toward a sink;
generating a second fluid flow, the second fluid flow flowing toward the imaging area in a direction opposed to that of the first fluid flow;
carrying ablation debris toward the sink in the first fluid flow;
allowing the second fluid flow to restrain the ablation debris from travelling past the sink; and,
drawing the ablation debris into the sink.

24. The method of claim 23 wherein generating the first fluid flow comprises expelling compressed gas through a nozzle directed toward the imaging area.

25. The method of claim 23 wherein carrying ablation debris toward the sink comprises carrying the ablation debris along a smooth surface of the laser-sensitive medium through a gap between the surface and a barrier projecting toward the surface.

26. The method of claim 23 wherein drawing the ablation debris into the sink comprises drawing the ablation debris in a direction perpendicular to a surface of the laser-sensitive medium.

27. The method of claim 23 wherein the first fluid flow comprises a diverging jet of a gas.

28. The method of claim 27 wherein the second fluid flow comprises a diverging jet of a gas.

29. The method of claim 27 wherein the first fluid flow is directed toward a surface of the laser-sensitive medium at an angle in the range of 5 degrees to 25 degrees.

30. The method of claim 23 wherein carrying the ablation debris toward the sink comprises, in a vicinity of the imaging area, accelerating the ablation debris in the first direction and, in a vicinity of the sink, decelerating the ablation debris in the first direction.

31. A method for removing ablation debris generated during imaging of an imaging area of a laser-sensitive medium, the method comprising:
generating a first fluid flow directed across the imaging area and then through a gap between the laser-sensitive medium and an edge of a barrier adjacent to the imaging area;
sucking the ablation debris away from the laser-sensitive medium into a sink on a second side of the barrier away from the imaging area; and,
on the second side of the barrier generating a second fluid flow, the second fluid flow flowing, in a vicinity of the sink, in a direction opposed to a direction of the first fluid flow in the vicinity of the sink.

32. A method for removing ablation debris generated during imaging of an imaging area of a laser-sensitive medium, the method comprising:
generating a first fluid flow across the imaging area, the first fluid flow directed in a first direction toward a sink;
generating fluid curtain on a side of the sink such that the sink is positioned between the imaging area and at least a portion of the fluid curtain;
carrying ablation debris toward the sink in the first fluid flow;
allowing the fluid curtain to restrain the ablation debris from travelling past the sink; and,
drawing the ablation debris into the sink.

33. The method of claim 32 wherein carrying ablation debris toward the sink comprises carrying the ablation debris along a smooth surface of the laser-sensitive medium through a gap between the surface and a barrier projecting toward the surface.

* * * * *